United States Patent
Sbisa et al.

(10) Patent No.: US 6,768,793 B1
(45) Date of Patent: Jul. 27, 2004

(54) TELECOMMUNICATIONS RESOURCE CONNECTION AND OPERATION USING A SERVICE CONTROL POINT

(75) Inventors: Daniel Charles Sbisa, Blue Springs, MO (US); Shigeru Uchiyama, Overland Park, KS (US); Karen Harden Miller, Overland Park, KS (US); Bruce Fredrick Salisbury, Olathe, KS (US); James David Setter, Overland Park, KS (US); Steven Eugene Norby, Lafayette, CO (US)

(73) Assignee: Sprint Communications Company L.P., Overland Park, KS (US)

( * ) Notice: Subject to any disclaimer, the term of this patent is extended or adjusted under 35 U.S.C. 154(b) by 100 days.

(21) Appl. No.: 10/158,731

(22) Filed: May 30, 2002

Related U.S. Application Data

(63) Continuation of application No. 09/063,902, filed on Apr. 21, 1998, now Pat. No. 6,470,081, which is a continuation-in-part of application No. 08/842,384, filed on Apr. 23, 1997, now Pat. No. 5,933,486.

(51) Int. Cl.[7] .................................................. H04M 7/00
(52) U.S. Cl. ............................ 379/221.01; 379/221.09; 379/230; 379/212.01
(58) Field of Search ..................... 379/67.1, 68, 70–72, 379/88.16, 207.01, 207.02, 207.14, 207.15, 210.02, 211.01, 211.02, 212.01, 219, 220.01, 221.08–221.12, 221.41, 229, 230

(56) References Cited

U.S. PATENT DOCUMENTS

| 5,418,844 A | * | 5/1995 | Morrisey et al. | ...... 379/221.09 |
|---|---|---|---|---|
| 5,448,633 A | | 9/1995 | Jamaleddin et al. | |
| 5,572,583 A | * | 11/1996 | Wheeler et al. | ........ 379/221.09 |
| 5,590,187 A | | 12/1996 | Greenspan | |
| 5,675,635 A | | 10/1997 | Vos et al. | |
| 5,684,866 A | | 11/1997 | Florindi et al. | |
| 5,694,463 A | | 12/1997 | Christie et al. | |
| 5,793,853 A | | 8/1998 | Sbisa | |
| 5,825,780 A | | 10/1998 | Christie | |
| 5,828,740 A | | 10/1998 | Khuc et al. | |
| 5,864,614 A | | 1/1999 | Farris et al. | |
| 5,920,562 A | | 7/1999 | Christie et al. | |
| 5,933,486 A | | 8/1999 | Norby et al. | |
| 5,949,869 A | | 9/1999 | Sink et al. | |
| 6,075,855 A | | 6/2000 | Christiansen et al. | |
| 6,097,803 A | | 8/2000 | Sbisa | |
| 6,215,864 B1 | | 4/2001 | Goyal et al. | |
| 6,262,992 B1 | | 7/2001 | Nelson et al. | |
| 6,470,081 B1 | * | 10/2002 | Sbisa et al. | ............ 379/221.09 |

* cited by examiner

*Primary Examiner*—Roland G. Foster

(57) ABSTRACT

A Service Control Point (SCP) directs a telecommunications network to connect a resource only when the resource is needed. When the resource is no longer needed, the SCP selects a new connection for the network. The SCP directs the network to disconnect the resource and use the new connection so the resource does not remain on the line during the entire call. The invention can be used to add and drop multiple resources from a call while the call is in progress. The SCP also provides context information for the call so multiple resources can access context information for the call.

20 Claims, 9 Drawing Sheets

TELECOMMUNICATIONS RESOURCE CONNECTION AND OPERATION USING A SERVICE CONTROL POINT

RELATED APPLICATIONS

This patent application is a continuation of U.S. patent application Ser. No. 09/063,902, now U.S. Pat. No. 6,470,081 B1, entitled "Telecommunications Resource Connection and Operation Using a Service Control Point" that was filed on Apr., 21, 1998, which is a continuation-in-part of U.S. Ser. No. 08/842,384 filed Apr. 23, 1997 U.S. Pat. No. 5,933,486, which are both assigned to the same entity as this application. U.S. patent application Ser. No. 09/063,902 and U.S. Pat. No. 5,933,486 are hereby incorporated by reference into this application.

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention is related to the field of telecommunications, and in particular, to the use of a Service Control Point (SCP) to direct the connection, operation, and disconnection of a resource during a call.

2. Background

In a telecommunications network, a Service Control Point (SCP) provides routing information to a telecommunications switch for a call. The telecommunications switch receives the call and transmits a query message to the SCP. The SCP processes the query message and returns a response message containing the routing information to the switch. For example, the switch may receive an "800" call and query the SCP with the "800" number. The SCP processes the "800" number and returns a routing number to the switch. These query and response messages are typically Signaling System #7 (SS7) Transaction Capabilities Application Part (TCAP) messages that are well known in the art.

A telecommunications resource provides a service to a call and is sometimes referred to as a service platform. Voice mail and calling card calls are some examples of the services provided by these resources. The use of these services is experiencing accelerated growth that is putting a strain on current networks. Unfortunately, the resource often remains in the call connection during the entire call although it only applies service at the beginning of the call. For example, the resource may provide a prepaid card service and forward the call to the destination number. The resource may only be used for a minute, but may remain tied-up on the call for over an hour. The capacity of the resource is used until the call is terminated. In addition, the connection to the resource cannot be re-used until the call is terminated. There is a need for technology that uses a resource only for the time required applying the service.

The telecommunications network often obtains routing information from an SCP to connect a call to a resource. The routing information can be a switch and connection coupled to the resource. The resource typically provides a service to the call based on the called and calling number that are provided over the connection. After providing the service, the resource often extends the call to a destination, but the resource remains in the call path. SCPs are not used to disconnect the resource and extend the call over a new connection.

The telecommunications network typically connects the call to the resource over a dedicated access line or an Integrated Service Digital Network (ISDN) line. ISDN has the capability to disconnect a resource from a call and to extend the call over another connection. Unfortunately, this requires ISDN connections between all switches and resources. It also requires that the switches and resources be equipped with the ISDN programming that is required to exchange and process the ISDN messaging to accomplish the disconnection and reconnection. The extensive deployment of this ISDN programming across all the resources and associated switches would prove to be costly.

Resources require context information to determine how to handle a call. The context information provided to the resource is often restricted to the information that can be out-pulsed over the connection to the resource. The out-pulsed information is generally the called number and the calling number. The resource must then collect any remaining information from the caller. This lack of information restricts the ability of the resource to deliver services to the call. When multiple resources are used, the caller may have to repeat the same information to different resources during the call. Callers become frustrated when constantly repeating information. In addition, time is wasted while the information is repeated. There is a need for technology that allows multiple resources to share context information for a call.

SUMMARY

The invention solves the above problems with a Service Control Point (SCP) that directs the network to connect the resource only when it is needed. When the resource is no longer needed, the SCP selects a new connection for the network. The SCP directs the network to disconnect the resource and use the new connection so the resource does not remain on the line during the entire call. The SCP provides for resource disconnection over dedicated access lines and ISDN lines using TCAP messaging. Use of the SCP in this manner avoids the extensive deployment of ISDN programming in the resources and switches. The SCP also provides context information so multiple resources can access context information for the call. Providing context information enhances the ability of the resource to apply services to a call and avoids repetitive data collection.

The invention includes methods and systems for handling a call in a telecommunications network using an SCP. The SCP receives a query message for the call from the telecommunications network. The SCP processes the query message to select first routing information. The SCP generates a first response message that contains the first routing information and transmits the first response message to the telecommunications network. The first routing information causes the telecommunications network to route the call to a telecommunications resource.

The SCP generates a context information message that contains context information for the call and transmits the context information message to a server. The server receives the context information message and stores the context information. The telecommunications resource generates and transmits a context request message to the server after receiving the call. The server receives the context request message from the telecommunications resource and processes the context request message to generate a context answer message that contains the context information. The server transmits the context answer message to the telecommunications resource.

The telecommunications resource receives the context answer message and processes the call based on the context information. The telecommunications resource generates a transfer message in response to processing the call and transmits the transfer message to the SCP. The SCP receives the transfer message for the call from the telecommunications resource after the telecommunications resource has provided a service to the call. The SCP processes the transfer message to select second routing information. The SCP generates a second response message that contains the second routing information and transmits the second response message to the telecommunications network. The second routing information causes the telecommunications network to disconnect the telecommunications resource and extend the call over a new connection.

DETAILED DESCRIPTION

Figure 1:
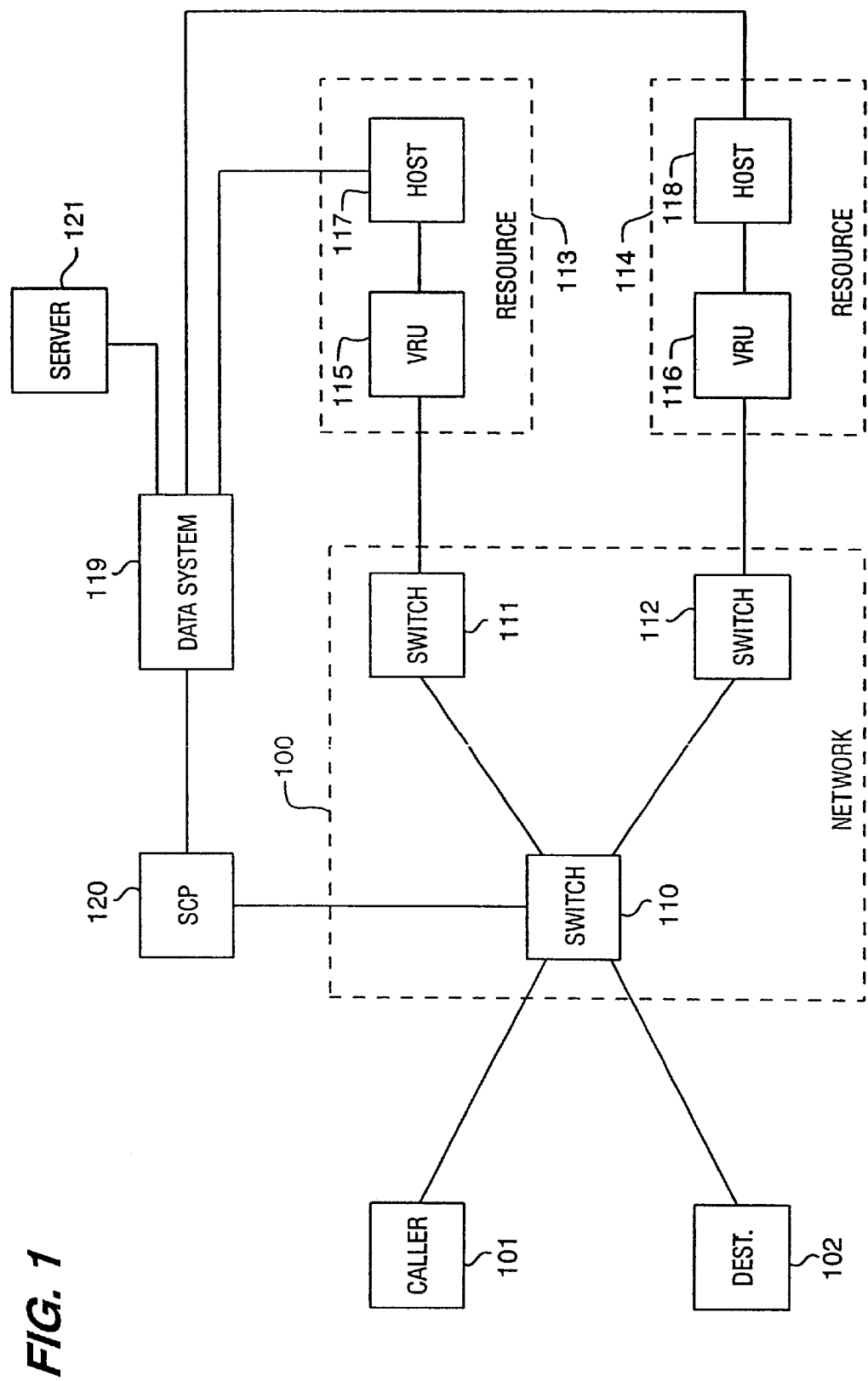
FIG. 1 is a block diagram of system architecture for a version of the invention.

Network Architecture—FIG. 1

FIG. 1 depicts a network 100 that is connected to a caller 101 and a destination 102. The network 100 is comprised of a switch 110 that is connected to switches 111 and 112. Switches 111 and 112 are connected to resources 113 and 114 respectively. Resource 113 is comprised of a Voice Response Unit (VRU) 115 and a host computer 117. Resource 114 is comprised of a VRU 116 and a host computer 118. The switch 110 is also linked to a Service Control Point (SCP) 120. A data system 119 interconnects the SCP 120, a context server 121, and the host computers 117–118. Those skilled in the art appreciate that there are typically numerous callers, destinations, and other conventional components associated with a telecommunications network that are not shown on FIG. 1 for reasons of clarity.

The switches 110–112 are network elements that are capable of extending and disconnecting communications paths in response to signaling messages. The switches are linked with one another to exchange signaling messages with an example being Signaling System #7 (SS7) links and signal transfer points. Some examples of the switches 110–112 are class 4 switches, ATM switches, and wireless switches. The DMS-250 is a class 4 switch that is supplied by Nortel. The switches 110–112 extend communications paths over connections such as dedicated access lines, ISDN connections, DS0 connections, ATM connections, and wireless connections.

The resources 113–114 are operational to provide services to the call. Examples of services include, but are not limited to, voice recognition, tone detection, digit collection, voice capture, voice announcements, calling cards, voice mail, operator services, interactive routing, and promotions. The resources 113–114 include conventional components that are required to provide these types of services to a call. In this example, the resources 113–114 are each comprised of a VRU and a host computer. The VRU is a well-known device for accepting caller inputs, such a voice and digits, and for playing messages to the caller. The host computer controls resource operations with one example being a Himalaya computer supplied by Tandem.

Those skilled in the art appreciate that resources can take many different forms. For example, a single host computer can drive multiple VRUs or be integrated within a single VRU. The resource may include an internal switch, such as a Summa 4 switch. A resource such as an operator center may not include a VRU. The resource could be a part of the telecommunications network or a part of a customer-controlled system. The various forms of telecommunications resources are applicable to the invention.

The SCP 120 is a processing system that receives query and transfer messages and returns response messages. Typically, the query and response messages are well known SS7 TCAP messages. One example of the SCP 120 is an SCP supplied by the Tandem Corporation that is configured and operated according to the following disclosure. The SCP 120 is linked to the switch 110 over a link with one example being a SS7 link. Data system 119 could be a conventional data network such as a protected TCP/IP network. The context server 121 is a processor for storing and providing context information for a call with one example being a TCP/IP server.

Aside from the modifications for the invention as detailed below, the components and connections depicted on FIG. 1 are conventional and well known in the art. Those skilled in the art recognize that there are numerous variations of the components and architecture depicted on FIG. 1 that also include a service control processing system, a switching system, and a resource. The invention is not restricted to the specific components and architecture depicted on FIG. 1, but applies to the various related architectures and components containing a service control processing system, a switching system, and a resource.

Figure 2:
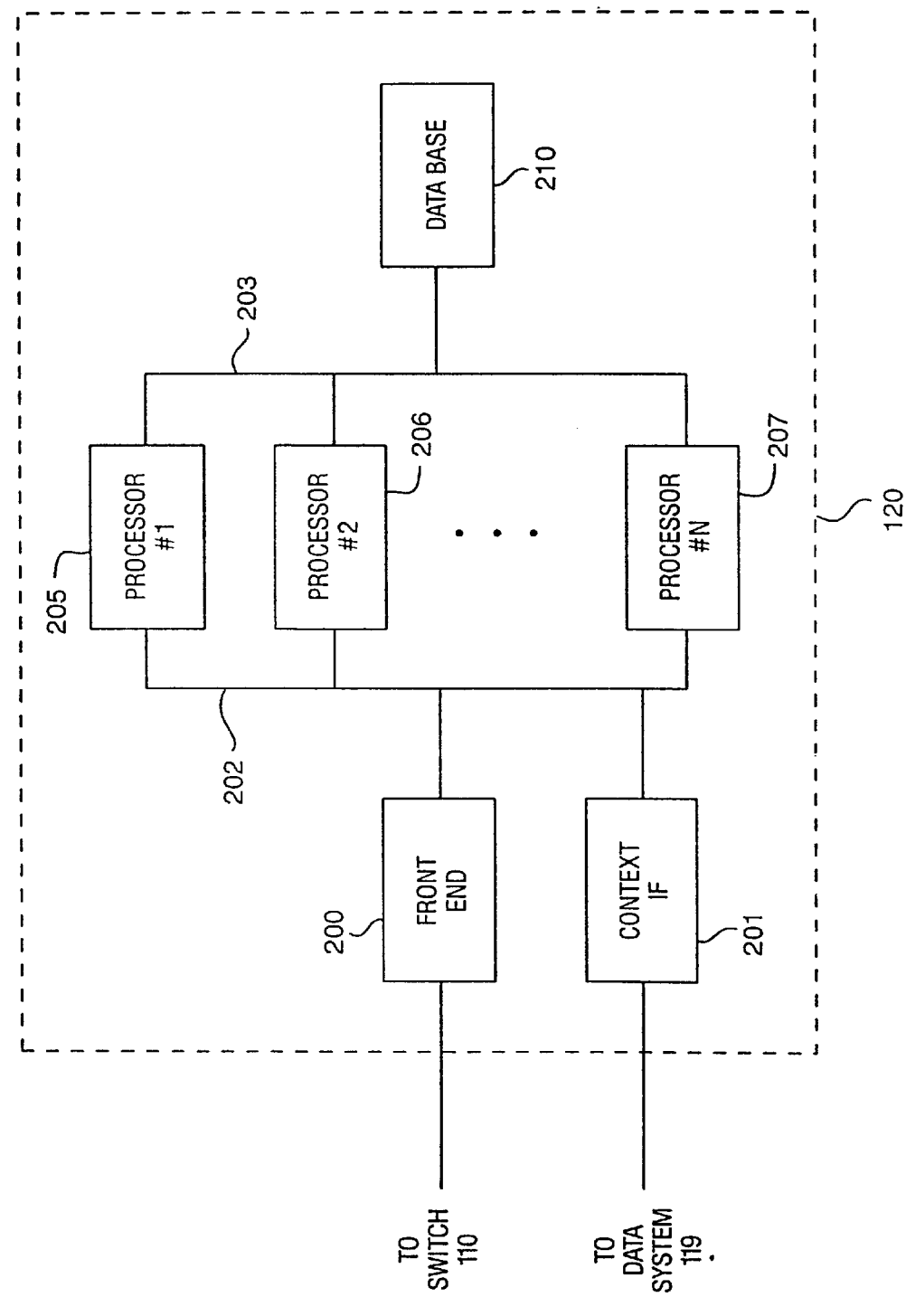
FIG. 2 is a block diagram of an SCP architecture for a version of the invention.
Figure 3:
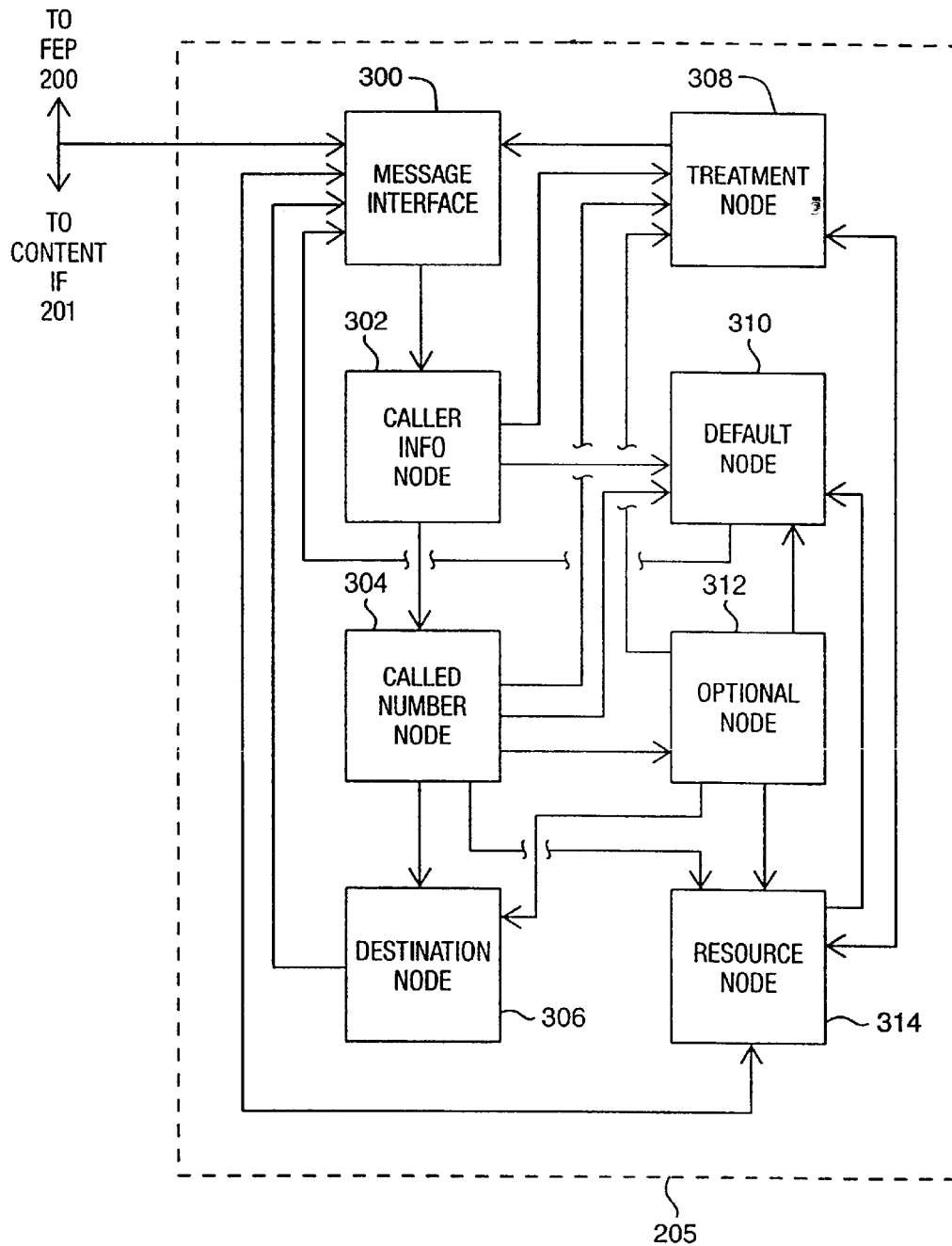
FIG. 3 is a logic diagram of SCP operation in a version of the invention.

SCP Architecture and Operation—FIGS. 2–3

FIG. 2 depicts an architecture for the SCP 120 in some embodiments of the invention. The SCP 120 is a processing system, and as those skilled in the art are aware, a processing system can be comprised of a single CPU or can be distributed across multiple CPUs. An SCP is preferred, but any processing system that supports the functionality and architectural configuration required by the invention is suitable.

The SCP 120 is comprised of a front-end processor (FEP) 200, a context interface 201, central processing units (CPUs) 205–207, a database 210, and links 202–203. The FEP 200 and the context interface 201 are connected to the link 202. The CPUs 205–207 are connected to links 202–203. The database 210 is connected to the link 203. An example of FEP 200 is the Tandem ST-2000. The FEP 200 includes SS7 message transfer part functionality and SS7 signaling connection control part functionality that is known in the art. The context interface 201 is a physically redundant TCP/IP interface using two IP controllers, two IP addresses, and a round-robin configuration.

Multiple CPUs are depicted on FIG. 2 although only CPUs 205–207 are shown for clarity. An example of the CPUs 205–207, the link 203, and the database 210 is the Tandem Himalaya loaded with the Tandem Guardian operating system, in addition to database management software and various conventional utilities. The link 202 could be any data link for interfacing processors.

The FEP 200 exchanges query and response messages with the switch 110. Although they are not shown for clarity, the FEP 200 could handle numerous such links to other elements in network 100. The context interface 201 receives transfer messages from the hosts. The CPUs 205–207 receive the query messages through the FEP 200 and receive the transfer messages through the context interface 201. The CPUs 205–207 process the query and transfer messages to select routing information. The routing information is typically a switch and connection to a resource or a destination. The CPUs 205–207 access the database 210 to support the processing. The CPUs 205–207 forward response messages to the FEP 200 for processing and transfer to the switch 110.

The CPUs 205–207 collect context information. For some calls, the CPUs 205–207 generate context information messages for the context interface 201 to transfer to the context information server 121. For other calls, the CPUs 205–207 forward the context information to a CPU in the SCP 120 for internal storage. In this situation, the CPU 206 could be dedicated to context information processing. Other CPUs would forward context information to the CPU 206 for storage. Information might be forwarded between the CPUs 205–207 using the Inter-Processor Communications Protocol (IPCP). When a context request message arrives from the data system 119, the context interface 201 provides the context request message to the CPU 206. The CPU 206 processes the context request message to generate the context answer message and sends the context answer message to the context interface 201 for processing and transfer to the proper host over the data system 119.

FIG. 3 depicts the operation of the processing logic in CPU 205 of the SCP 120 in some embodiments of the invention. The processing logic in other CPUs would be similar. The CPU 205 uses the message interface 300 to exchange messages with the FEP 200 and the context interface 201. The CPU 205 processes the messages from the message interface 300 using nodes. A node is a data structure that can be entered with information or pointers. The CPU 205 processes the data structure until the node yields either the desired information or a pointer to another node.

The CPU 205 first enters a caller information node 302 with the caller information from the query message. The caller information node can be used to partition callers into logical groupings. For example, callers who subscribe to a particular service provider could be grouped together in the caller information node 302. The caller information node 302 can partition callers by their telephone number, by a circuit used to place the call, by the method of carrier selection, or by a type of device used to place the call. In addition, callers who are not desired can be pointed to the treatment node 308 to reject the call attempt. The caller information node 302 yields a pointer to the called number node 304, the destination node 308, or the default node 310.

The called number node 304 is entered by using a pointer to identify a segment of the data structure. This pointer is referred to as a tree ID and the segment of the data structure is referred to as a tree. The particular tree is entered by using the called number. The called number node 304 yields a pointer to the destination node 306, the treatment node 308, the default node 310, the optional decision node 312, or the resource node 314.

The destination node 306 yields a selected switch and connection for the call, and produces an SCP response message with this information for the message interface 300. The treatment node 308 is used to reject calls or apply any treatment for the given call profile. The treatment node 308 produces an SCP response message for message interface 300. The default node 310 is used to provide default connections or handle mistakes in the data structures. For example, calls could be routed to an operator using the default node 310. The default node 310 produces an SCP response message for the message interface 300. The optional decision node 312 is used to apply additional logic to the call as would be appreciated by those skilled in the art. Some examples of such additional logic are nodes for processing the call based on a time of day, II digits, call distribution, or remote processor information. The optional decision node 312 points to the destination node 306, the treatment node 308, the default node 310, or the resource node 314.

The resource node 314 can be accessed by any other node. The message interface 300 can enter a master routing table using information in a transfer message and yield a pointer to the resource node 314. The resource node 314 is also accessed by the called number node 304 if the called number determines the need for a resource. For example, if a calling card call is placed to a called number that represents the calling card service, the called number node 304 points to the resource node 314 to select routing information for a calling card service platform. The treatment node 308 can point to the resource node 314 where the treatment determines the need for a resource. For example, if a call needs referral to an operator, the treatment node 308 points to the resource node 314 to select routing information for an operator or operator center. In a similar fashion, the optional decision node 312 could point to the resource node based on its processing. The resource node 314 could point to the treatment node 308 or the default node 310.

The resource node 314 typically yields routing information that indicates the switch and trunk that are connected to the desired resource or destination. The resource node 314 generates a response message with a call ID and the routing information for transfer by the message interface 300. The call ID is used to associate messages and information with the call.

The resource node 314 initiates a process that collects context information for the call. The context information is collected from query messages, transfer messages, and resource node processing. The context information can be any information related to the call that is collected or generated by the telecommunications system. IN some embodiments of the invention, the context information is stored in a fixed file format and includes: the call ID, template ID, TCAP message transaction ID, originating switch ID, SCP ID, CDR record type, default node and tree information, called number, nature of the called number, calling number, nature of the calling number, account codes, authorization codes, credit card numbers, calling card numbers, query class, query sequence number, service type, call-leg sequence, DNIS, out-dial number, and other information that is passed in a transfer message. The above information elements are known in the art. In addition, those skilled in the art will recognize other information that could be included as context information.

The context information is stored and retrieved using the call ID. The context information is either stored in the context server 121 or a context information processor in the SCP 120. The resource node 314 stores a context location indicator that specifies the storage location of the context information. If the context location indicator specifies that the context information is to be stored in the SCP 120, then the resource node 314 forwards the context information to the message interface 300 for transfer to the resident SCP context information processor. If the context location indicator specifies that the context information is to be stored in the context server 121, then the resource node 314 forwards the context information to message interface 300 for transfer to the context server 121. Context information is typically discarded after the call is released or after time period, such as a 60 minute time period.

The context information includes a call-leg count that indicates the number of call-legs that are successfully established. For example, a connection from the switch 110 to the resource 114 represents one call-leg, and a connection from the switch 110 to the destination represents a second call-leg. The invention allows several call-legs to be added and dropped during a single call. The resource node 314 or the resources 114–115 can increment the call-leg sequence when they cause an extension of the call over a new leg. The SCP 120 does not increment the call-leg sequence based on a re-query.

The SCP 120 contains a terminating feature table that can be entered with a dialed number and tree ID to determine the Dialed Number Information Service (DNIS) digits. The DNIS digits usually represent the called number. The resource node 314 contains a DNIS condition that indicates if the call ID should be out-pulsed to the resource as the DNIS digits instead of the called number. The resource can then obtain the actual called number from the context information obtained with the call ID.

The resource node 314 initiates call detail records that are used for billing. Call detail records contain call-related information used by the billing system to bill the call. In some embodiments of the invention, the call detail records include the call ID, feature type, terminating access, customer ID, record type, and call-leg sequence. Those skilled in the art will recognize other information for inclusion in call detail records, and the invention is not restricted to the above listing. The resource node 314 generates a first call detail record when the first response is generated to route the call to the resource. The resource node 314 generates a second call detail record when the second response is generated to disconnect the resource and route the call over the new connection. The second call detail record incorporates information from the transfer message, such as the call ID, record type, originator ID, query sequence number, call-leg sequence, caller-entered digits, and out-dial number.

Network Operation—FIGS. 4–7

Figure 4:
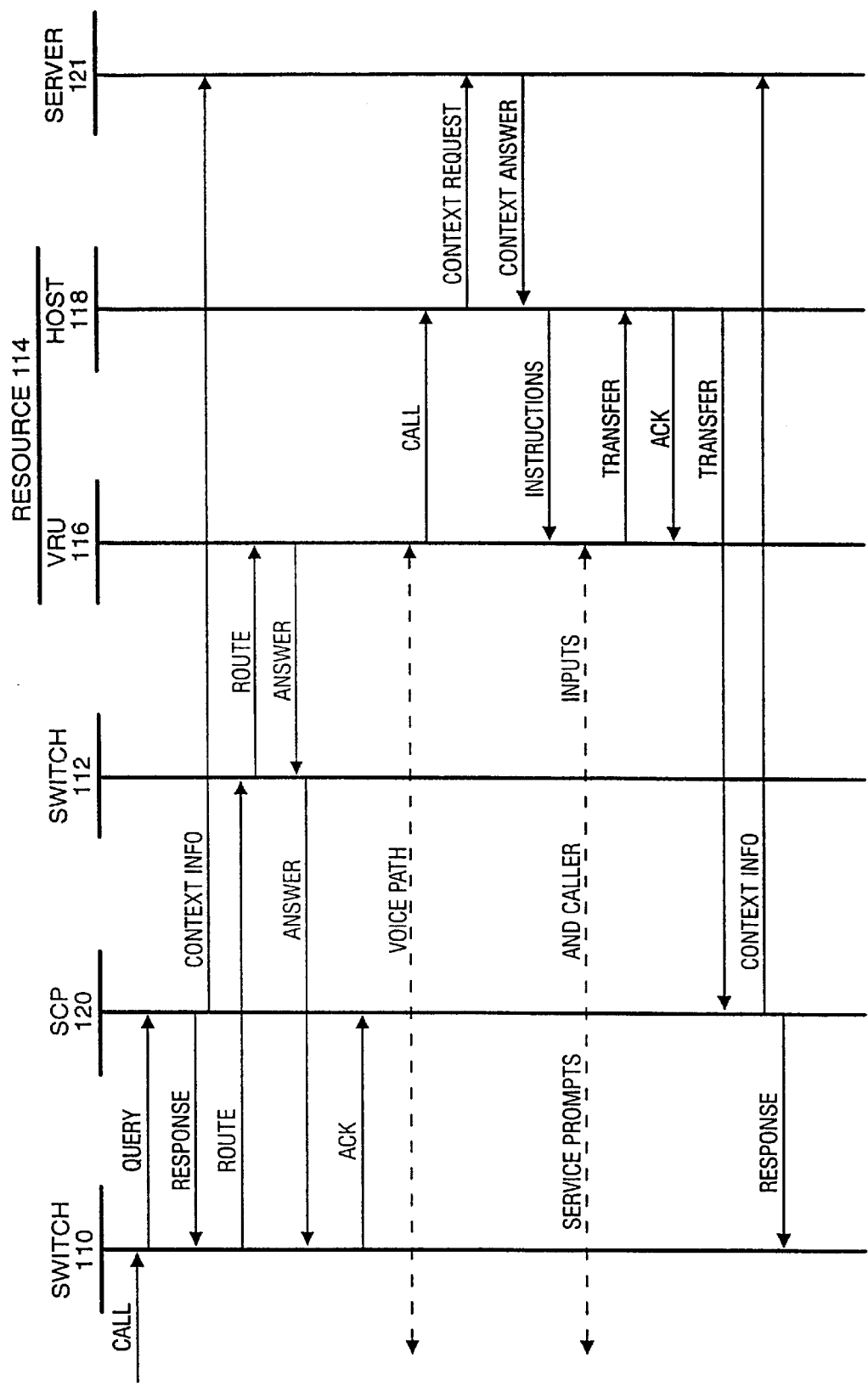
FIG. 4 is a message sequence chart of system operation for a version of the invention.

FIG. 4 is a message sequence chart that depicts the operation of the invention in some embodiments. Message sequence charts are a well-known format for depicting network operations. A call enters the network 100 into the switch 110. The switch 110 processes the call, and as a result, the switch 110 triggers and sends a query message for the call to the SCP 120. The SCP 120 receives and processes the query message. The SCP 120 assigns a unique call ID to the call. The call ID is used to associate context information and messages with the call.

Context information can either be stored in the SCP 120 or in the context server 121. The context location indicator in the SCP 120 and the first digit of the call ID identify the device that stores the context information for the call. In this example, the context information is stored in the context server 121, so the SCP 120 generates a context information message containing the context information and transmits the context information message to the context server 121 over the data system 119. The context server 121 receives and stores the context information under the call ID.

The SCP 120 also selects routing information for the call that causes the telecommunications switch 110 to route the call to the telecommunications resource 114. The SCP 120 generates a first response message that contains the selected routing information and transmits the first response message to the switch 110. Typically, the routing information is the identity of a switch and connection that are connected to the resource. In this example, the first response message identifies the switch 112 and a specific connection between the switch 112 and the VRU 116 of the resource 114.

The first response message also contains the call ID and a digits parameter. The call ID is usually provided to the resource by out-pulsing digits over the selected connection to the resource. The digits parameter includes the Dialed Number Information Service (DNIS) digits that may also be out-pulsed to the resource 114 if desired. The digits parameter also contains the call-leg sequence.

The switch 110 receives the first response message from the SCP 120 and routes the call to the resource 114 based on the routing information in the first response message. The switch 110 extends the call to the switch 112 identified in the routing information and transmits a route message to the switch 112. This route message includes the call ID and the routing information. The switch 112 processes the route message and extends the call over the connection identified in the routing information. The switch 112 also sends a route message to the VRU 116 of the resource 114. Typically, the route message to the VRU 116 consists of a series of digits that are out-pulsed from the switch 112 to the VRU 116 over the connection. The out-pulsed digits indicate the call ID and may also provide DNIS digits.

The VRU 116 indicates its acceptance of the call by returning an answer message to the switch 112. The switch 112 sends an answer message to the switch 110. The switch 110 sends an acknowledgment to the SCP 120 that indicates that the call is connected to the resource 114. At this point, a voice path is opened from the caller to the VRU 116 of the resource 114.

The VRU 116 instructs the host 118 that a call has been received and provides the call ID to the host 118. Typically, the host 118 generates a context request message containing the call ID, but in some cases, the host 118 can provide services to the call without context information by using only the out-pulsed digits. The first digit of the call ID specifies where the context information is stored. In this example, the context information is stored in the context server 121, so the host 118 transmits the context request message to the context server 121 over the data system 119.

The context request message contains the call ID and a template ID. The template ID indicates the set of information required by the resource. For example, a template ID of "1" requests a set of context information including: the call ID, the template ID, the originating switch ID, the called number, the calling number, the call-leg count, and the record type. Other template IDs could be used to request additional information such as the SCP ID, the query class, and resource information.

The context server 121 receives the context request message and uses the call ID to retrieve the context information. The context server uses the template ID to select a set of context information to provide in a context answer message. The context server 121 sends the context answer message to the host 118 of the resource 114 over the data system 119. The host 118 uses the context information to instruct the VRU 116 to process the call. For example, the host 118 might provide the following instruction to the VRU 116 based on the context information: 1) play the message, "to place an order, press one, and for customer service, press two," and 2) collect a tone from the caller. The VRU 116 executes the instructions and sends a transfer request to the host 118 when the processing instructions have been carried out. The transfer request contains the caller selection. The host 118 acknowledges the transfer request to the VRU 116 and processes the transfer request. In this example, processing entails translating the caller selection into an out-dial number. An out-dial number is typically a conventional telephone number. If the caller pressed "1" to place an order, then a telephone number for a sales representative is provided as the out-dial number. The host 118 sends the transfer message to the SCP 120.

The transfer message contains the information required by the SCP 120 to select a new connection. The transfer message typically includes the call ID, the record type, the call-leg count, the trigger index, and digit information. The digit information could represent any digits useful for additional call processing by the SCP 120 with some examples being an out-dial number, billing number, caller-entered digits, social-security number, or frequent flyer number.

The SCP 120 processes the call ID to associate the transfer message with the context information. The information in the transfer message is used to update the context information and to generate another call detail record. The SCP 120 sends a context information message to the context server 121 with the updated information. The SCP 120 also uses the information in the transfer message to select a new connection for the call. For example, the SCP 120 uses the trigger index to classify the call and enters a routing tree with the out-dial number to select a new switch and connection for extending the call. The SCP 120 generates a second response message identifying the new switch and connection and transmits the second response message to the switch 110. In some alternate embodiments, the second response may instruct the switch 110 to disconnect the resource and hold the call until further instructions are sent or a time period elapses.

Figure 5:
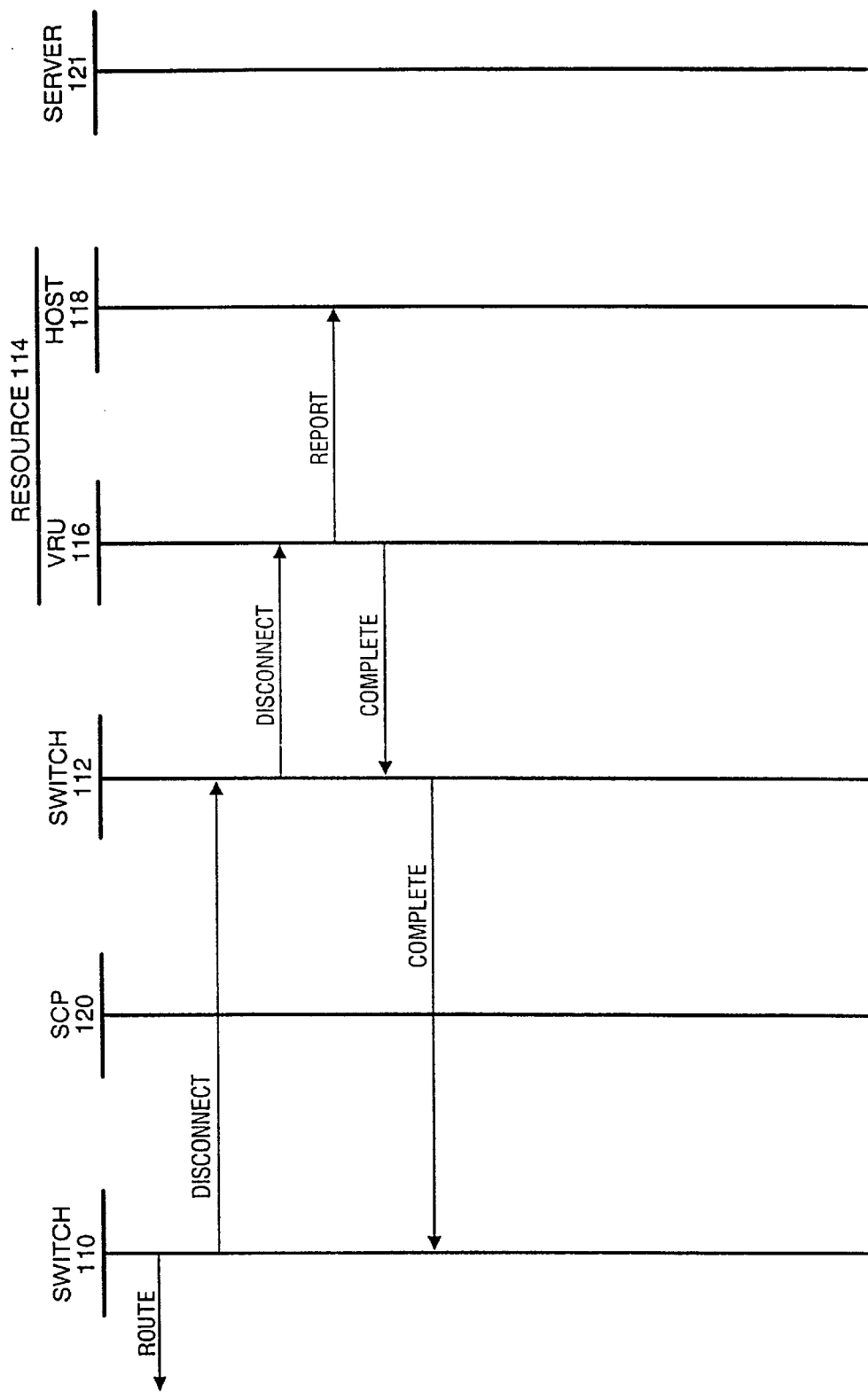
FIG. 5 is a message sequence chart of system operation for a version of the invention.

Referring to FIG. 5, the second response message is used by the switch 110 to route the call to a destination. The second response message identifies the call ID, the selected switch and connection, and the updated call-leg sequence. The switch 110 disconnects the resource 114 and extends the call to the selected switch identified in the second response message. The selected switch extends the call to the destination over the selected connection. If the switch that receives the second response is the selected switch, then that switch extends the call over the selected connection. In this example, the switch 110 is the selected switch, so the switch 110 extends the call over the selected connection to the destination 102. In some embodiments, the switch 110 sends a message to the SCP 120 that the resource has been disconnected.

The switch 110 sends a route message to facilitate extension of the communications path over the selected connection. Disconnection of the resource is carried out by sending a disconnect message to the switch 112. The switch 112 sends a disconnect message to the VRU 116 which reports the disconnect to the host 118. The VRU 116 returns a release complete message to the switch 110 which returns a release complete message to the switch 110. At this point, the resource 114 and the related connections are free for additional use by the network 100 while the call is still in progress.

If the resource 113 had been required for the call, the SCP 120 would have selected routing information for the resource 113, and the second response message would have caused the network 100 to route the call to the resource 113. A similar process to that discussed above would be repeated for the resource 113. Multiple resources can be connected, used, and disconnected in this manner for the same call. Those skilled in the art appreciate that any switch in the network 100 could have access to the SCP 120, and that calls could be routed as described above through any of the switches and resources using the SCP 120.

In the above example, the SCP 120 directed the network 100 to connect the caller 101 to the resource 114. The SCP 120 also provided context information for the call. The resource 114 used the context information to provide a service to the call. The resource 114 requested a call transfer after rendering the requested service. The SCP 120 used the transfer message to direct the network 100 to disconnect the resource 114 and to use a new connection to the destination 102. In a distinct advance in the art, the resource 114 and associated connections are freed-up before the call is terminated. The widespread deployment of ISDN was avoided by using an SCP and TCAP messaging. This significantly increases the capacity of the resource 114 to apply services to calls.

Figure 6:
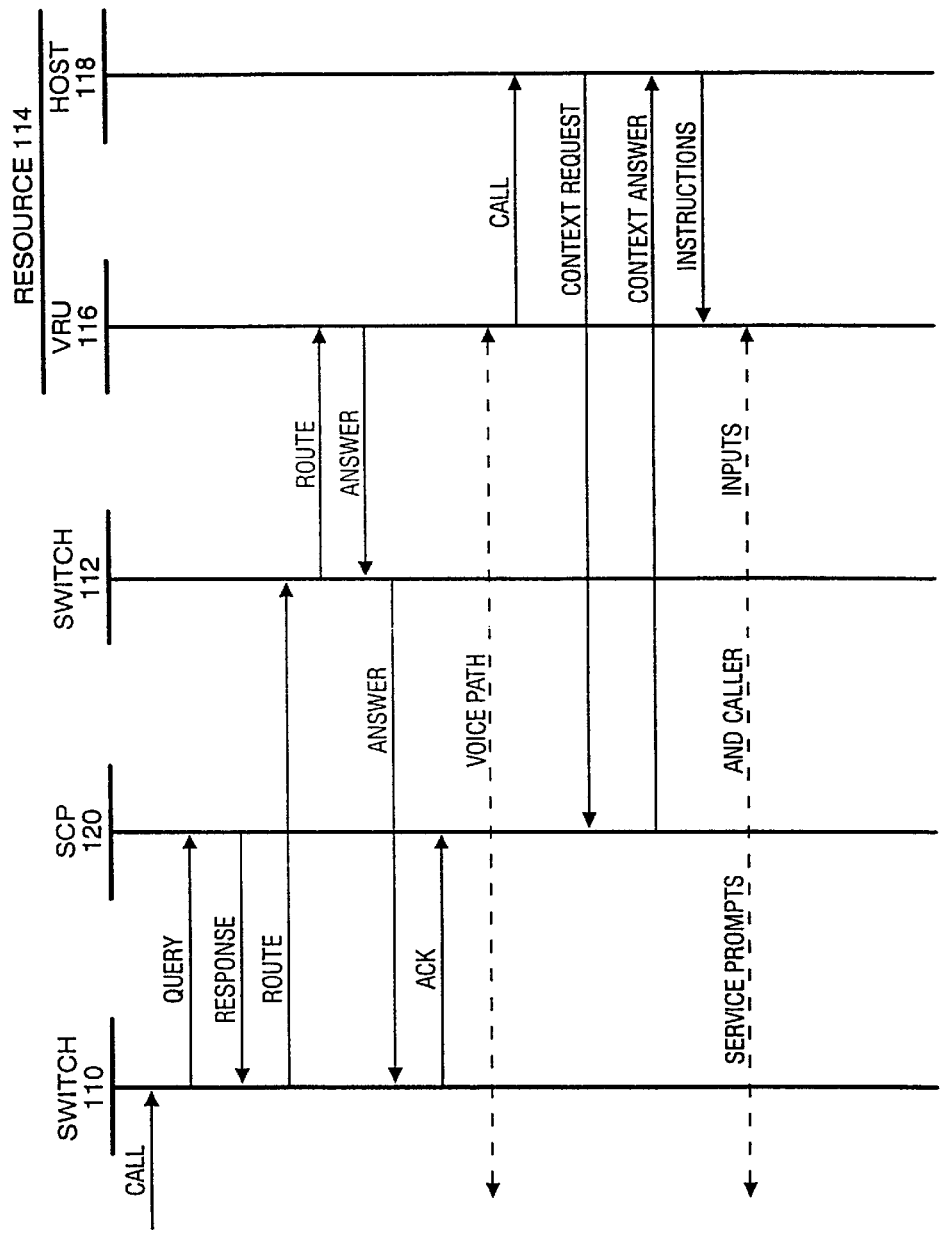
FIG. 6 is a message sequence chart of system operation for a version of the invention.

FIG. 6 depicts another embodiment of the invention where the SCP 120 stores and distributes the context information. A call enters the network 100 into the switch 110. The switch 110 processes the call, and as a result, the switch 110 triggers and sends a query message for the call to the SCP 120. The SCP 120 receives and processes the query message. The SCP 120 assigns a unique call ID to the call. In this example, the context location indicator in the SCP 120 specifies that the context information is stored in the SCP 120, so the SCP 120 forwards the context information to a context information processor in the SCP 120 for storage and distribution.

The SCP 120 also selects routing information for the call that causes the telecommunications switch 110 to route the call to the telecommunications resource 114. The SCP 120 generates a first response message that contains the selected routing information and transmits the first response message to the switch 110. The switch 110 receives the first response message from the SCP 120 and routes the call to the resource 114 based on the routing information in the first response message. The switch 110 extends the call to the switch 112 identified in the routing information and transmits a route message to the switch 112. The switch 112 processes the route message and extends the call over the connection identified in the routing information. The switch 112 also sends a route message to the VRU 116 of the resource 114. Typically, the route message to the VRU 116 consists of a series of digits that are out-pulsed from the switch 112 to the VRU 116 over the connection. The out-pulsed digits indicate the call ID and may also provide DNIS digits.

The VRU 116 indicates its acceptance of the call by returning an answer message to the switch 112. The switch 112 sends an answer message to the switch 110. The switch 110 sends an acknowledgment to the SCP 120 that indicates that the call is connected to the resource 114. At this point, a voice path is opened from the caller to the VRU 116 of the resource 114.

The VRU 116 instructs the host 118 that a call has been received and provides the call ID to the host 118. Typically, the host 118 generates a context request message containing the call ID. The first digit of the call ID specifies where the context information is stored. In this example, the context information is stored in the SCP 120, so the host 118 transmits the context request message to the SCP 120 over the data system 119.

The SCP 120 receives the context request message and uses the call ID to retrieve the context information. The SCP 120 uses the template ID to select a set of context information to provide in a context answer message. The SCP 120 sends the context answer message to the host 118 of the resource 114. The host 118 uses the context information to instruct the VRU 116 to process the call. For example, the host 118 might provide the following instruction to the VRU 116 based on the context information: 1) play the message, "to place an order, press one, and for customer service, press two," and 2) collect a tone from the caller. The VRU 116 executes the instructions and the remaining operations are similar to those described above for FIGS. 4–5.

Figure 7:
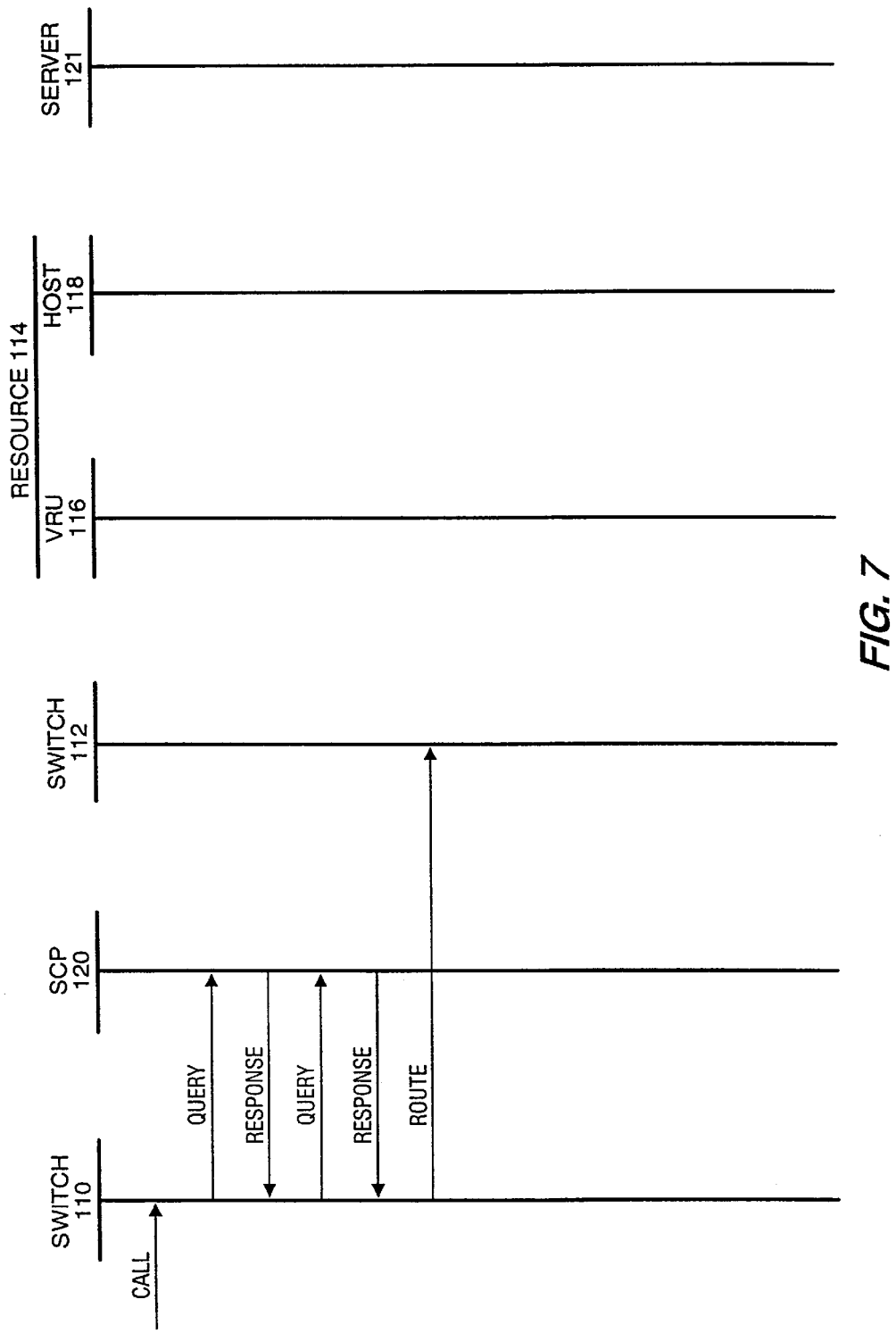
FIG. 7 is a message sequence chart of system operation for a version of the invention.

FIG. 7 depicts another embodiment of the invention where the switch re-queries the SCP for routing information. A call enters the network 100 into the switch 110. The switch 110 processes the call, and as a result, the switch 110 triggers and sends a first query message for the call to the SCP 120. The SCP 120 receives the first query message and processes message to select routing information that would cause the telecommunications switch 110 to route the call to the selected telecommunications resource 113. The SCP 120 generates a first response message containing the selected routing information and transmits the first response message to the switch 110.

The switch 110 receives the first response message from the SCP 120, but does not route the call based on the routing information. This might be because of a busy condition, network outages, or network congestion. The switch 110 sends a second query to the SCP 120. The second query includes the call ID, but increments the query index value by one. The SCP 120 receives the second query message and detects that the query index value has been incremented. The SCP 120 uses the call ID to locate the appropriate routing tree for additional processing to select additional routing information.

For example, the SCP 120 might select additional routing information that causes the telecommunications switch 110 to route the call to the selected telecommunications resource 114. The SCP 120 generates a second response message that contains the routing information and transmits the second response message to the switch 110. The switch 110 extends the connection to the switch 112 based on the new routing information and transmits a route message to the switch 112. The remaining operations are similar to those described above for FIGS. 4–6.

Figure 8:
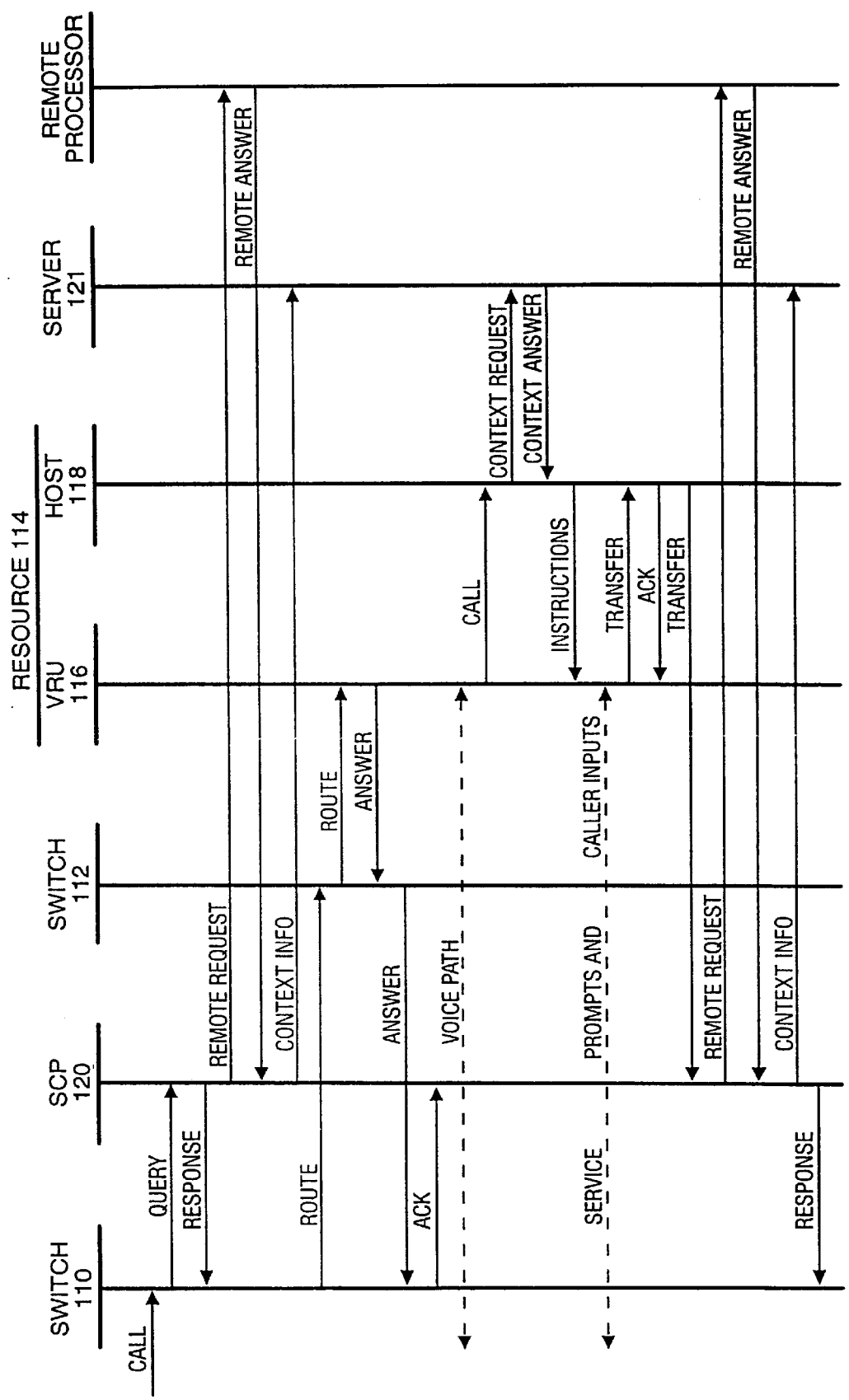
FIG. 8 is a message sequence chart of system operation for a version of the invention.
Figure 9:
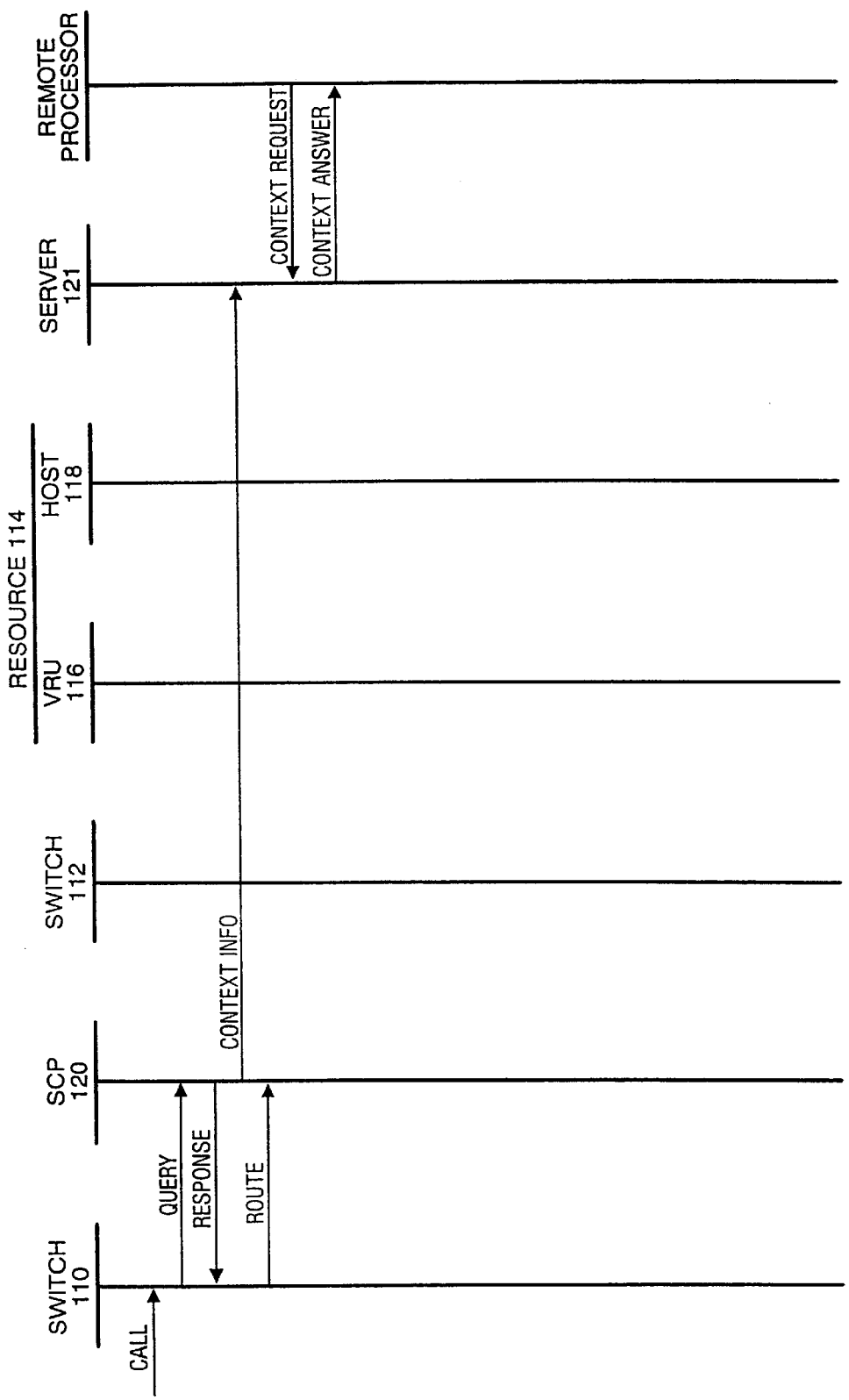
FIG. 9 is a message sequence chart of system operation for a version of the invention.

Remote Processing—FIGS. 8–9

FIG. 8 depicts the operation of the invention in some embodiments. A remote processor is shown at the far right. The remote processor is typically a customer-controlled computer. For example, the remote processor could be a part of an airline reservation system of an airline that is a customer of the telecommunications network. A call enters the network 100 into the switch 110. The switch 110 processes the call, and as a result, the switch 110 triggers and sends a query message for the call to the SCP 120. The SCP 120 receives and processes the query message. The SCP 120 assigns a unique call ID to the call. The call ID is used to associate context information and messages with the call.

The SCP 120 generates and sends a remote request to the remote processor. The remote request contains call-related information such as the call ID, called number, calling number or other context information. The remote processor responds to the SCP 120 with a remote answer containing information used by the SCP 120 to handle the call. For example, the remote processor might instruct the SCP 120 to route the call to another resource that plays an announcement to the caller and collects digits. The announcement could be a request for a frequent flyer number, and the caller-entered digits might represent the frequent flyer number.

Context information can either be stored in the SCP 120 or in the context server 121. The context location indicator in the SCP 120 and the first digit of the call ID identify the device that stores the context information for the call. In this example, the context information is stored in the context server 121, so the SCP 120 generates a context information message containing the context information and transmits the context information message to the context server 121 over the data system 119. The context server 121 receives and stores the context information under the call ID. In this example, the context information incorporates the remote processor instructions.

The SCP 120 also selects routing information for the call that causes the telecommunications switch 110 to route the call to the telecommunications resource 114. The SCP 120 generates a first response message that contains the selected routing information and transmits the first response message to the switch 110. Typically, the routing information is the identity of a switch and connection that are connected to the resource. In this example, the first response message identifies the switch 112 and a specific connection between the switch 112 and the VRU 116 of the resource 114.

The first response message also contains the call ID and a digits parameter. The call ID is usually provided to the resource by out-pulsing digits over the selected connection to the resource. The digits parameter includes the Dialed Number Information Service (DNIS) digits that may also be out-pulsed to the resource 114 if desired. The digits parameter also contains the call-leg sequence.

The switch 110 receives the first response message from the SCP 120 and routes the call to the resource 114 based on the routing information in the first response message. The switch 110 extends the call to the switch 112 identified in the routing information and transmits a route message to the switch 112. This route message includes the call ID and the routing information. The switch 112 processes the route message and extends the call over the connection identified in the routing information. The switch 112 also sends a route message to the VRU 116 of the resource 114. Typically, the route message to the VRU 116 consists of a series of digits that are out-pulsed from the switch 112 to the VRU 116 over the connection. The out-pulsed digits indicate the call ID and may also provide DNIS digits.

The VRU 116 indicates its acceptance of the call by returning an answer message to the switch 112. The switch 112 sends an answer message to the switch 110. The switch 110 sends an acknowledgment to the SCP 120 that indicates that the call is connected to the resource 114. At this point, a voice path is opened from the caller to the VRU 116 of the resource 114.

The VRU 116 instructs the host 118 that a call has been received and provides the call ID to the host 118. Typically, the host 118 generates a context request message containing the call ID. The first digit of the call ID specifies where the context information is stored. In this example, the context information is stored in the context server 121, so the host 118 transmits the context request message to the context server 121.

The context request message contains the call ID and a template ID. The template ID indicates the set of information required by the resource. For example, a template ID of "1" requests a set of context information including: the call ID, the template ID, the originating switch ID, the called number, the calling number, the call-leg count, and the record type. Other template IDs could be used to request additional information such as the SCP ID, the query class, and resource information. In this example, the template ID also includes a request for the remote processor instructions.

The context server 121 receives the context request message and uses the call ID to retrieve the context information. The context server uses the template ID to select a set of context information to provide in a context answer message. The context server 121 sends the context answer message to the host 118 of the resource 114.

The host 118 uses the context information to instruct the VRU 116 to process the call. For example, the host 118 might provide the following instruction to the VRU 116 based on the context information: 1) play the message, "please enter your frequent flyer number," and 2) collect digits from the caller. The VRU 116 executes the instructions and sends a transfer request to the host 118 when the processing instructions have been carried out. The transfer request contains the caller-entered digits. The host 118 acknowledges the transfer request to the VRU 116 and processes the transfer request to generate a transfer message. The host 118 sends the transfer message to the SCP 120.

The transfer message typically includes the call ID, the record type, the call-leg count, the trigger index, and digit information. The digit information includes the caller-entered digits that represent the frequent flyer number. The SCP 120 processes the call ID to associate the transfer message with the context information.

The SCP 120 sends another remote request to the remote processor including the caller-entered digits that represent the frequent flyer number. The remote processor processes the remote request and responds to the SCP 120 with new call-handling information. For example, the remote processor might provide an out-dial number to an elite operator center for callers with extensive travel histories associated with their frequent flyer numbers.

The information in the transfer message and remote answer are used to update the context information and to generate another call detail record. The SCP 120 sends another context information message to the context server 121 with the updated information. The SCP 120 also uses the information in the transfer message and remote answer message to select a new connection for the call. For example, the SCP 120 uses the telephone number from the remote processor to enter a routing tree and select a new switch and connection for extending the call. The SCP 120 generates a second response message identifying the new switch and connection and transmits the second response message to the switch 110. The remaining operations are similar to those described above for FIGS. 4–7.

FIG. 9 depicts the operation of the invention in some embodiments. A remote processor is shown at the far right. The remote processor is typically a customer-controlled computer. For example, the remote computer could be a part of an airline reservation system of an airline that is a customer of the telecommunications network. A call enters the network 100 into the switch 110. The switch 110 processes the call, and as a result, the switch 110 triggers and sends a query message for the call to the SCP 120. The SCP 120 receives and processes the query message.

The SCP 120 assigns a unique call ID to the call. The call ID is used to associate context information and messages with the call. Context information can either be stored in the SCP 120 or in the context server 121. The context location indicator in the SCP 120 and the first digit of the call ID identify the device that stores the context information for the call. In this example, the context information is stored in the context server 121, so the SCP 120 generates a context information message containing the context information and transmits the context information message to the context server 121 over the data system 119. The context server 121 receives and stores the context information under the call ID. The SCP 120 also generates a first response message that contains the selected routing information and transmits the first response message to the switch 110 as described above for the other examples. The remaining operations are similar to those described for FIGS. 4–8.

In addition, the remote processor sends a context request to the context server 121. The context server responds to the request with a context answer. In this way, the remote processor can obtain context information about particular calls. The remote processor can also obtain general call statistics of interest.

In some embodiments of the invention, the context server 121 includes world-wide-web server functionality and the remote processor includes world-wide-web browser functionality. A remote user could use the web browser to access the web server over an internet connection to obtain context information from the context server 121 through the web interface.

Those skilled in the art can appreciate variations of the above-described embodiments that fall within the scope of the invention. As a result, the invention is not limited to the specific embodiments discussed above, but only by the following claims and their equivalents.

What is claimed is:

1. A method of operating a communication system, the method comprising:
   receiving a call into a switching system;
   processing the call in the switching system to generate a query message;
   transmitting the query message from the switching system;
   receiving the query message into a service control point (SCP);
   processing the query message in the SCP to select first routing information for the call;
   generating a first response message in the SCP that includes the first routing information;
   assigning an identifier for the call, wherein the identifier indicates which device is storing context information for the call;
   transmitting the first response message that includes the identifier;
   receiving the first response message in the switching system;

processing the first response message in the switching system and routing the call to a telecommunications resource based on the first routing information;

providing the identifier for the call to the telecommunications resource to enable the telecommunication resource to locate which device is storing the context information for the call;

receiving a transfer message in the SCP from the telecommunications resource after the telecommunications resource has provided a service to the call;

processing the transfer message in the SCP to select second routing information;

generating and transmitting a second response message that includes the second routing information;

receiving the second response message in the switching system;

processing the second response message in the switching system to disconnect the telecommunications resource; and extending the call in the switching system over a new connection based on the second routing information.

2. The method of claim 1 further comprising:

receiving the transfer message in the SCP;

processing the identifier to determine if the context information is stored in the SCP or a context server; and updating the context information stored in the SCP or the context server with information in the transfer message.

3. The method of claim 1 wherein the transfer message includes an out-dial number.

4. The method of claim 1 wherein the transfer message includes a billing number.

5. The method of claim 1 wherein the transfer message includes caller-entered digits.

6. The method of claim 1 wherein the transfer message includes a social security number.

7. The method of claim 1 further comprising generating a call detail record in the SCP for billing with information in the transfer message.

8. The method of claim 1 further comprising:

receiving the call into the telecommunications resource;

servicing the call in the telecommunications resource;

generating the transfer message after servicing the call; and transmitting the transfer message from the telecommunications resource to the SCP.

9. The method of claim 1 further comprising:

receiving the call into the telecommunications resource;

receiving caller information from a caller of the call in the telecommunications resource;

generating the transfer message that includes the caller information; and transmitting the transfer message from the telecommunications resource to the SCP.

10. The method of claim 1 further comprising:

receiving the call into the telecommunications resource;

receiving the identifier for the call;

processing the identifier to determine which device is storing the context information for the call;

transmitting a context request message to the device storing the context information for the call;

receiving a context answer message in the telecommunication resource from the device;

servicing the call in the telecommunications resource based on the context answer message;

generating the transfer message after servicing the call; and transmitting the transfer message from the telecommunications resource to the SCP.

11. A communication system, comprising:

a switching system configured to receive a call, process the call to generate a query message, and transmit the query message; and a service control point (SCP) configured to process the query message to select first routing information for the call, assign an identifier for the call, wherein the identifier indicates which device is storing context information for the call, and generate and transmit a first response message that includes the first routing information and includes the identifier;

the switching system further configured to process the first response message, route the call to a telecommunications resource based on the first routing information, and provide the identifier for the call to the telecommunications resource to enable the telecommunication resource to locate which device is storing the context information for the call;

the service control point (SCP) further configured to receive a transfer message from the telecommunications resource after the telecommunications resource has provided a service to the call, process the transfer message to select second routing information, and generate and transmit a second response message that includes the second routing information; and the switching system further configured to process the second response message to disconnect the telecommunications resource and to extend the call over a new connection based on the second routing information.

12. The communication system of claim 11 wherein the SCP is further configured to:

receive the transfer message;

process the identifier to determine if the context information is stored in the SCP or a context server; and process the transfer message to update the context information stored in the SCP or the context server.

13. The communication system of claim 11 wherein the transfer message includes an out-dial number.

14. The communication system of claim 11 wherein the transfer message includes a billing number.

15. The communication system of claim 11 wherein the transfer message includes caller-entered digits.

16. The communication system of claim 11 wherein the transfer message includes a social security number.

17. The communication system of claim 11 wherein the SCP is further configured to:

generate a call detail record for billing with information in the transfer message.

18. The communication system of claim 11 further comprising:

the telecommunications resource configured to receive the call into the telecommunications resource, service the call, generate the transfer message after servicing the call, and transmit the transfer message from the telecommunications resource to the SCP.

19. The communication system of claim 11 further comprising:

the telecommunications resource configured to receive the call, receive caller information from a caller of the call, generate the transfer message that includes the caller information, and transmit the transfer message to the SCP.

20. The communication system of claim 11 further comprising:

the telecommunication resource confined to receive the call, receive the identifier for the call, process the identifier to determine which device is storing the context information for the call, transmit a context request message to the device storing the context information for the call, receive a context answer message from the device, service the call based on the context answer message, generate the transfer message after servicing the call, and transmit the transfer message to the SCP.

* * * * *